United States Patent
Phan et al.

(10) Patent No.: US 12,177,771 B2
(45) Date of Patent: Dec. 24, 2024

(54) METHOD FOR UPDATING A TERMINAL COMPRISING A SECURE ELEMENT

(71) Applicant: THALES DIS FRANCE SAS, Meudon (FR)

(72) Inventors: Ly Thanh Phan, La Ciotat (FR); Jean-François Gros, La Ciotat (FR); Jean-Yves Fine, La Ciotat (FR); Vincent Dany, La Ciotat (FR)

(73) Assignee: THALES DIS FRANCE SAS, Meudon (FR)

( * ) Notice: Subject to any disclaimer, the term of this patent is extended or adjusted under 35 U.S.C. 154(b) by 420 days.

(21) Appl. No.: 17/619,313

(22) PCT Filed: May 12, 2020

(86) PCT No.: PCT/EP2020/063149
§ 371 (c)(1),
(2) Date: Dec. 15, 2021

(87) PCT Pub. No.: WO2020/254039
PCT Pub. Date: Dec. 24, 2020

(65) Prior Publication Data
US 2022/0248315 A1    Aug. 4, 2022

(30) Foreign Application Priority Data
Jun. 18, 2019  (EP) .................. 19305776

(51) Int. Cl.
*H04W 48/18* (2009.01)
*G06N 3/047* (2023.01)
(Continued)

(52) U.S. Cl.
CPC ............ *H04W 48/18* (2013.01); *G06N 3/047* (2023.01); *H04W 8/12* (2013.01); *H04W 24/08* (2013.01); *H04W 84/042* (2013.01)

(58) Field of Classification Search
CPC ........ G06N 3/047; H04W 8/12; H04W 24/08; H04W 48/08; H04W 48/18; H04W 84/042
See application file for complete search history.

(56) References Cited

U.S. PATENT DOCUMENTS 7,139,570 B2 * 11/2006 Elkarat .................... H04W 8/06
455/433
7,333,808 B2 * 2/2008 Elkarat ................. H04W 48/18
455/435.2
(Continued)

FOREIGN PATENT DOCUMENTS

| CN | 115244992 A * | 10/2022 | ............ H04W 48/18 |
| EP | 3384700 B1 * | 8/2019 | ............ H04W 12/06 |

(Continued)

OTHER PUBLICATIONS

3rd Generation Partnership Project (3GPP), 23.122: Technical Specification Group Core Network and Terminals: Non-Access-Stratum (NAS) functions related to Mobile Station (MS) in idle mode, Jun. 2019, Release 16, Version 16.2.0 (Year: 2019).*
(Continued)

*Primary Examiner* — Eric Nowlin

(57) ABSTRACT

Provided is a method for manufacturing a metal smart card comprising a metal insert having a peripheral edge extending to the peripheral edge of the card and at least one printed cover sheet. The method comprises the steps of assembling a printed support sheet and at least one insert using an assembly tray comprising elements for positioning the support sheet and each insert, and extracting each metal smart card from the printed support sheet by cutting or machining the sheet around a periphery of the insert. Other embodiments disclosed.

12 Claims, 2 Drawing Sheets

(51) Int. Cl.
  *H04W 8/12* (2009.01)
  *H04W 24/08* (2009.01)
  *H04W 84/04* (2009.01)

(56) References Cited

U.S. PATENT DOCUMENTS

| | | | | |
|---|---|---|---|---|
| 8,543,109 | B2* | 9/2013 | Kim | H04W 60/005 |
| | | | | 455/435.1 |
| 8,611,900 | B2* | 12/2013 | Pandit | H04W 36/385 |
| | | | | 455/435.2 |
| 8,848,660 | B2* | 9/2014 | Vallurupalli | H04W 48/16 |
| | | | | 370/254 |
| 8,989,734 | B2* | 3/2015 | Ekici | H04W 52/0216 |
| | | | | 455/574 |
| 9,294,988 | B2* | 3/2016 | Vallurupalli | H04W 48/18 |
| 9,413,515 | B2* | 8/2016 | Jin | H04W 48/16 |
| 9,900,765 | B2* | 2/2018 | Gonzalez | H04L 63/0876 |
| 10,064,122 | B2* | 8/2018 | Jiang | H04W 48/14 |
| 10,182,322 | B2* | 1/2019 | Chai | H04W 4/24 |
| 10,219,309 | B2* | 2/2019 | Zhu | H04W 8/00 |
| 10,356,599 | B2* | 7/2019 | Gonzalez | H04M 15/8044 |
| 10,362,473 | B2* | 7/2019 | Gupta | H04W 48/14 |
| 10,764,727 | B2* | 9/2020 | Chai | H04W 8/02 |
| 10,911,934 | B2* | 2/2021 | Rajadurai | H04W 12/04 |
| 11,089,534 | B2* | 8/2021 | Jun | H04W 48/20 |
| 11,622,256 | B2* | 4/2023 | Rajadurai | H04W 8/06 |
| | | | | 455/433 |
| 11,792,631 | B2* | 10/2023 | Tang | H04W 4/90 |
| | | | | 455/404.2 |
| 12,035,229 | B2* | 7/2024 | Catovic | H04W 60/06 |
| 2004/0192306 | A1* | 9/2004 | Elkarat | H04W 8/06 |
| | | | | 455/435.2 |
| 2005/0282544 | A1 | 12/2005 | Oommen et al. | |
| 2006/0211420 | A1* | 9/2006 | Ophir | H04W 8/20 |
| | | | | 455/435.2 |
| 2007/0054665 | A1* | 3/2007 | Elkarat | H04W 8/06 |
| | | | | 455/432.1 |
| 2008/0064393 | A1* | 3/2008 | Oommen | H04W 48/18 |
| | | | | 455/432.1 |
| 2010/0015978 | A1* | 1/2010 | Yoon | H04W 48/16 |
| | | | | 455/435.3 |
| 2010/0240370 | A1* | 9/2010 | Pandit | H04W 36/385 |
| | | | | 455/436 |
| 2011/0014913 | A1 | 1/2011 | Yoon | |
| 2012/0077494 | A1* | 3/2012 | Kim | H04W 60/005 |
| | | | | 455/435.1 |
| 2012/0243467 | A1* | 9/2012 | Vallurupalli | H04W 48/18 |
| | | | | 370/328 |
| 2013/0084855 | A1* | 4/2013 | Ekici | H04W 52/0245 |
| | | | | 455/435.2 |
| 2013/0115942 | A1* | 5/2013 | Kuc | H04W 48/18 |
| | | | | 455/432.1 |
| 2014/0004854 | A1* | 1/2014 | Veran | H04W 48/18 |
| | | | | 455/432.1 |
| 2014/0357263 | A1* | 12/2014 | Vallurupalli | H04W 48/08 |
| | | | | 455/432.1 |
| 2015/0195701 | A1* | 7/2015 | Tuilier | H04W 60/06 |
| | | | | 455/433 |
| 2015/0256993 | A1 | 9/2015 | Bellamkonda | |
| 2015/0257044 | A1 | 9/2015 | Jiang | |
| 2015/0295696 | A1* | 10/2015 | Jin | H04L 5/14 |
| | | | | 370/277 |
| 2017/0156174 | A1* | 6/2017 | Chaponniere | H04W 48/16 |
| 2017/0164270 | A1* | 6/2017 | Jiang | H04W 48/16 |
| 2017/0180969 | A1* | 6/2017 | Chai | H04M 15/55 |
| 2017/0196033 | A1* | 7/2017 | Zhu | H04W 76/14 |
| 2017/0353851 | A1* | 12/2017 | Gonzalez | H04M 15/8044 |
| 2018/0063751 | A1* | 3/2018 | Shi | H04W 36/32 |
| 2018/0091967 | A1* | 3/2018 | Gupta | H04W 8/02 |
| 2018/0255449 | A1* | 9/2018 | Gonzalez | H04W 48/18 |
| 2019/0098463 | A1* | 3/2019 | Chai | H04M 15/55 |
| 2020/0178153 | A1* | 6/2020 | Jun | H04W 28/0865 |
| 2020/0221281 | A1* | 7/2020 | Rajadurai | H04W 8/06 |
| 2021/0211860 | A1* | 7/2021 | Rajadurai | H04W 8/06 |
| 2021/0258869 | A1* | 8/2021 | Di Girolamo | H04W 48/16 |
| 2021/0282084 | A1* | 9/2021 | Catovic | H04W 60/06 |
| 2021/0337457 | A1* | 10/2021 | Jun | H04W 76/11 |
| 2022/0141636 | A1* | 5/2022 | Tang | H04W 76/50 |
| | | | | 455/404.2 |
| 2022/0248315 | A1* | 8/2022 | Phan | H04W 48/08 |

FOREIGN PATENT DOCUMENTS

| | | | | |
|---|---|---|---|---|
| EP | 3554115 | A1 * | 10/2019 | H04W 12/06 |
| EP | 4258714 | A1 * | 10/2023 | H04W 8/183 |
| EP | 3554115 | B1 * | 11/2023 | H04W 12/06 |
| WO | WO-2010107448 | A1 * | 9/2010 | H04W 36/385 |
| WO | WO-2017095750 | A2 * | 6/2017 | H04W 12/06 |
| WO | WO-2021183548 | A2 * | 9/2021 | H04W 48/18 |

OTHER PUBLICATIONS

International Search Report (PCT/ISA/210) and Written Opinion (PCT/ISA/237) mailed on Aug. 12, 2020, by the European Patent Office as the International Searching Authority for International Application No. PCT/EP2020/063149 (WO2020/254039)—[14 pages].

* cited by examiner

METHOD FOR UPDATING A TERMINAL COMPRISING A SECURE ELEMENT

FIELD

The present invention relates to telecommunications and concerns methods of updating a terminal comprising a secure element. It relates particularly to methods of downloading a list of preferred networks from an OTA platform over-the-air to terminals.

BACKGROUND

In a cellular telecommunication system like for example GSM, UMTS or LTE, a subscriber is able to communicate with a base station of a network operator with his terminal. The terminal is for example a mobile terminal (like a mobile phone, a smartphone or a PDA) cooperating with a secure element like a SIM card, a Universal Integrated Circuit Card (UICC), an embedded UICC (eUICC) or an integrated UICC (iUICC).

Steering of roaming, or "preferred roaming", is the process by which a mobile operator decides which partner their subscribers will use whilst roaming. There are many mobile or cellular network operators, or providers, in the world, often more than one in a single country. These network operators include, but are not limited to, operators who provide mobility services using GSM, GPRS, 3G, LTE, CDMA, TDMA, and WCDMA technology. These network operators provide voice and data services to their own subscribers and to subscribers from other networks. When a network operator provides service to a subscriber from a foreign country, it is referred to as "international roaming". When the network operator provides service to a subscriber from another network in the same country, it is referred to as "national roaming".

When the subscriber is registered in the network with which it has a direct billing relationship, the serving network is often referred to as the Home Public Land Mobile Network (HPLMN). If the subscriber is in a network with which it does not have a direct billing relationship, the serving network is referred to as the Visited Public Land Mobile Network (VPLMN).

Various network operators have partnership agreements with each other that include more favorable roaming charges than non-partners receive. These partnership agreements may define usage quotas. Partner networks are "preferred" networks for the network operator's subscriber to register with when roaming. Non-partner networks are "non-preferred" networks to the subscriber. Network operators can maximize their margins and the roamers can get more attractive roaming rates and services if roamers roam on their home mobile operator's preferred partner networks.

In order to steer the subscriber's secure element to a preferred network, a mobile network operator (MNO) managing this secure element can download a list of preferred networks in dedicated files of the secure element. MNOs manage their roaming usage quota to optimize their partnership agreements, by "steering" their roaming subscribers towards some specific roaming partner mobile operators when usage quota for these operators are not reached, and avoiding others whereby quota has been reached. The list of preferred networks may be stored in one or several files at terminal side.

The download of the files is typically realized via OTA (Over-The-Air): Once connected to an OTA platform or server, these files can be updated in the secure element. Such updates may be realized through SMS or HTTPs.

Typically, an OTA server identifies a VPLMN list (based on the location of the targeted terminal) from a local database previously populated by a Steering of Roaming (SoR) device. Then the OTA server sends it securely to the user equipment (i.e. terminal comprising a secure element) that must be updated. The SoR device periodically computes an updated VPLMN list for each terminal location and sends them to the OTA server which stores them. Because of operational constraints, the SoR device refreshes the VPLMN lists with a period of several hours (typically 4 hours). Due to response time constraint at registration of a user equipment, the OTA server cannot request an updated VPLMN list on the fly at registration time. Consequently, a single VPLMN list per location is provisioned in the OTA server by the SoR device with a validity period of several hours. This may lead to misuse (overuse/underuse) of the quota negotiated in the partnership agreements.

There is a need to develop a new method for updating a VPLMN list in a terminal comprising a secure element.

SUMMARY

The invention aim at solving the above mentioned technical problem.

An object of the present invention is a computer-implemented method for updating a terminal comprising a secure element. An OTA platform receives at least a location data reflecting the location of the terminal and a request for downloading a list of preferred networks in the terminal. The method comprises the following steps:
  i) the OTA platform receives both a set of lists of preferred networks and a group of weighting factors, each list of said set having one weighting factor of said group attached to it,
  ii) the OTA platform selects one list of preferred networks from the set by using a selection function taking into account at least the location data, a random value and the weighting factors attached to the lists of said set, and
  iii) by enciphering the selected list, the OTA platform generates an enciphered list of preferred networks and sends over the air the enciphered list to the terminal.

Advantageously, each of said preferred networks may be associated with its own target roaming quota usage, at least one weighting factor associated to a given list of the set may be updated as a result of an optimization function which aims at generating one weighting factor based on a target roaming quota usage associated to each preferred network of the given list.

Advantageously, a monitoring unit may generate an actual roaming quota usage (Hist_Q) by tracking roaming communication used by a fleet of terminals that may comprise said terminal. An analyzer unit may record an historical data of said weighting factors (Hist_SP_i) by tracking weighting factors attached to lists selected by said selection function. The optimization function may use internal parameters when running. The internal parameters may be updated as a result of an Adjustment function which aims at checking that the difference between a forecast SPi generated by said optimization function applied to said actual roaming quota usage (Hist_Q) and the historical data (Hist_SP_i) is lower than a predefined threshold.

Advantageously, the Adjustment function may use machine learning.

Another object of the present invention is an OTA platform able to receive a location data reflecting the location of a terminal comprising a secure element and a request for downloading a list of preferred networks in the terminal. The OTA platform is configured to receive both a set of lists of preferred networks and a group of weighting factors, each list of said set having one weighting factor of said group attached to it. The OTA platform is configured to select one list of preferred networks from the set by using a selection function taking into account at least the location data, a random value and the weighting factors attached to the lists of said set. The OTA platform is configured to generate an enciphered list of preferred networks by enciphering the selected list and to send over the air the enciphered list to the terminal.

Another object of the present invention is a system for updating a terminal comprising a secure element. The system comprises an OTA platform according to the invention and a Steering of Roaming device which is configured to provide the OTA platform with both the set of lists of preferred networks and the group of weighting factors.

Advantageously, each of said preferred networks may be associated with its own target roaming quota usage. The Steering of Roaming device may be configured to update at least one weighting factor associated to a given list of the set as a result of an optimization function which aims at generating one weighting factor based the Target roaming quota usage associated to at least one preferred network belonging to the given list.

Advantageously, the system may comprise a monitoring unit configured to generate an actual historical communication quota usage (Hist_Q) by tracking roaming communication used by a fleet of terminals that may comprise said terminal. The system may comprise an analyzer unit configured to record an historical data (hist_SP_i) of weighting factors attached to lists selected by said selection function. The analyzer unit may be configured to provide the Weighting factor manager said historical data (hist_SP_i) of weighting factors for said Weighting factor manager to adjust via an Adjustment function the internal parameters of the optimization function based on actual communication quota usage and historical actual weighting factors selected by the OTA platform.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION

The invention may apply to any type of terminal whose VPLMN list must be updated by an OTA server. For example the terminal may be a phone or a Machine-to-Machine (M2M) component.

According to an embodiment of the invention, the OTA server is provided with several lists of VPLMN lists per location. In addition, a weighting factor (also called selection probability) is allocated to each VPLMN list and the OTA server performs a stochastic selection to identify the VPLMN list to be sent to the terminal for update.

Figure 1:
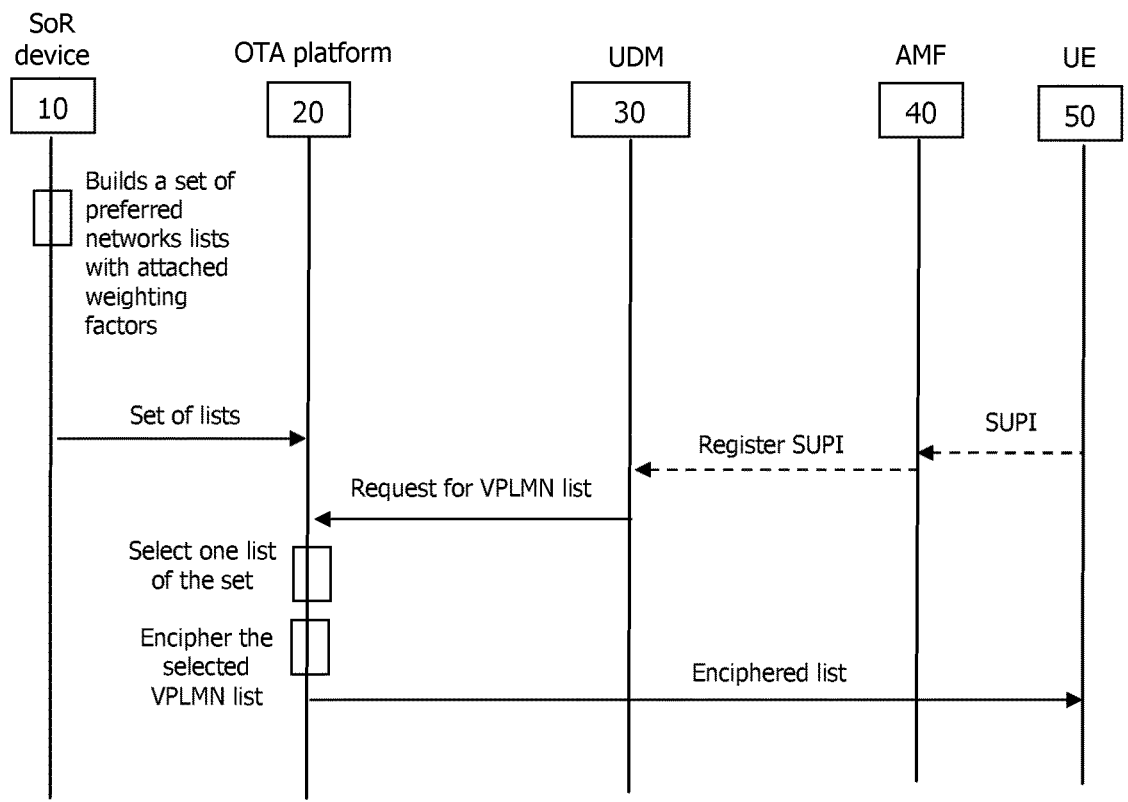
FIG. 1 depicts a flowchart showing a first example of method for updating a VPLMN list in a terminal according to the invention.

FIG. 1 illustrates a flowchart of an example of the method for updating a VPLMN list in a terminal according to the invention.

During an initial populating phase, a SoR device 10 generates a plurality of VPLMN lists and their attached weighting factors. More precisely, the SoR device identifies both several VPLMN lists for every location to be covered and a group of weighting factors. The plurality of the identified VPLMN lists constitutes a set of VPLMN lists. Each VPLMN list is a prioritized list. Each list is allocated to a location. The location may be a reference of a cell, a country, a state or a region for example.

For instance, a first weighting factor SP1 may be attached to a first list comprising the following preferred networks: PLMN1, PLMN2, PLMN3, PLMN4 and a second weighting factor SP2 may be attached to a second list comprising the following preferred networks: PLMN2, PLMN1, PLMN3, PLMN4.

The set of VPLMN lists may comprise lists having different length.

The SoR device can be implemented as a software executed in one or several hardware computers.

In this example the terminal 50 is a smart phone comprising a eUICC. The terminal 50 is intended to work in 5G environment.

During an operational phase, the terminal 50 sends its Subscription Permanent Identifier (SUPI) to an Authentication and Mobility management Function (AMF) 40. The AMF 40 sends to a Unified Data Management (UDM) 30 a request aiming at registering the terminal. On receipt of the request, the UDM 30 sends to the OTA platform 20 a request for getting an updated VPLMN list. The OTA platform also receives a location data reflecting the location of the terminal 50. In one embodiment the request received by the OTA platform 20 may include the location data. Alternatively, the OTA platform may get the location data through another message.

Depending on the deployed framework, the request to get a new list may be sent from the terminal to the OTA server 20 through other physical entities.

Then the OTA platform 20 selects one list of preferred networks from the set by using a selection function (also named function S) taking into account the location data, a random value and the weighting factors attached to the lists of said set. The OTA platform 20 may trigger an internal (or external) random generator to get a new random value.

For instance, the selection function may preselect all lists compliant with the received location data. A range of values may be assigned to each pre-selected list, which amplitude is proportional to the associated selection probability (SP). For instance the first list is assigned range starting from 1 to 40 if its associated SP1 is 40%, the second list is assigned range 41 to 70 if its associated SP2 is 30% and so on. The total range of values is made equal to 100 so that the amplitude assigned to each list is proportional to the probability SPi associated to the list of PLMNs. The selection function S may then get a random number between 1 and 100, say 50. Depending on the drawn number, the selected list is the one which the drawn random number belongs to the assigned range of values. In the example, if the random number is 68, it is the second list of PLMNs that is selected with the assigned range 41 to 70.

In one embodiment, the OTA platform 20 may execute the selection function S upon reception of the request for getting an updated VPLMN list. It is to be noted that the time needed for executing the selection function is compliant with response time constraints (about 5 ms) of 5G networks.

In all embodiments, the OTA platform 20 enciphers the selected list of preferred networks and sends the enciphered list to the terminal 50.

The terminal is then assumed to update its content by deciphering the enciphered list. The new list of preferred networks may be stored in the secure element comprised in the terminal or in another memory of the terminal.

According to the invention, the random value allows to smooth the future use of the selected preferred networks by the terminal.

Figure 2:
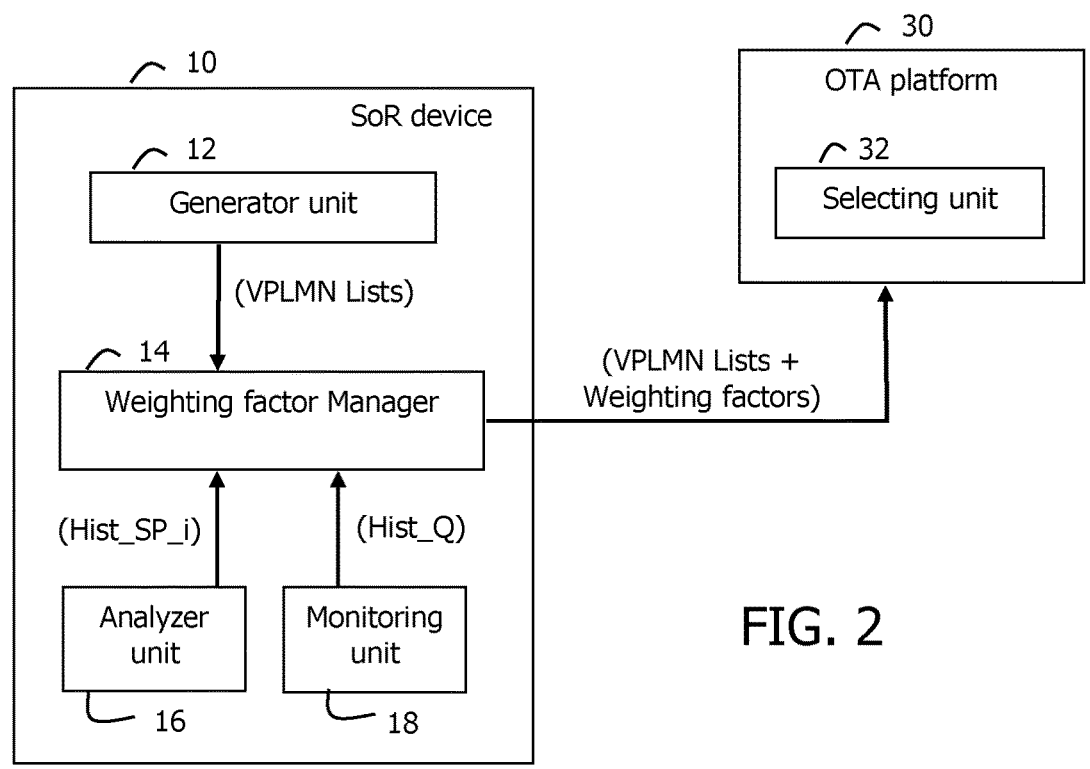
FIG. 2 shows an example of architecture of system including an OTA server and a SoR device according to the invention.

FIG. 2 illustrates an example of architecture of a system including an OTA server 20 and a SoR device 10 according to the invention.

The OTA server (i.e. OTA platform) 20 includes a selecting unit 32 configured to execute the selection function. In addition, the OTA server includes software or hardware components (not shown at FIG. 2) as conventional OTA platforms do for enciphering the selected list with a secret associated with the terminal 50. The OTA server includes a memory component for storing the set of lists received from the SoR device.

In one embodiment, the selecting unit 32 may be implemented as a set of software instructions running on a processor of a computer. In another embodiment, the selecting unit 32 may be implemented as a combination of software and hardware instructions.

The SoR device 10 includes a Generator unit 12, a Weighting factor manager 14, an Analyzer unit 16 and a Monitoring unit 18.

The Monitoring unit 18 is configured to generate an actual roaming quota usage Hist_Q by tracking roaming communication used by a fleet of terminals including the terminal 50. The monitoring unit 18 is similar to the existing monitoring system of usual SoR devices.

The Analyzer unit 16 is configured to record historical data Hist_SP_i of the weighting factors by tracking weighting factors attached to lists selected by the selection function. In other words, the Analyzer unit 16 may track weighting factors attached to the lists sent to a fleet of terminals including the terminal 50. The Analyzer unit 16 may be configured to communicate with the OTA platform 20.

In another embodiment, the Analyzer unit 16 may be outside the SoR device 10. For instance, it may be hosted in the OTA server 20 or in another computer machine.

The Generator unit 12 is configured to identify a set of lists of preferred networks in such a way that several lists of the set are allocated to the same location.

In one embodiment, the Generator unit 12 may generate the lists of preferred networks.

In one embodiment, the Generator unit 12 may build the set by selecting lists of preferred networks in a preexisting registry.

The Weighting factor manager 14 is configured to get the set of preferred network lists from the Generator unit 12, to get the actual roaming quota usage Hist_Q from the Monitoring unit 18 and to get the historical data Hist_SP_i from the Analyzer unit 16.

The Weighting factor manager 14 is configured to generate Weighting factors and to allocate a Weighting factor to each list of the set.

Preferably, the Weighting factor manager 14 may be configured to update the Weighting factors allocated to the lists of a set by using an optimization function F.

In one embodiment, each of the preferred networks is associated with its own target roaming quota usage. A target roaming quota usage (also called Target_Q) may be expressed as a duration of communication or a quantity of data transmitted over a preferred network.

For instance, the optimization function F may compute a new value for the Weighting factor SP2 based on the target roaming quota value Target_Q allocated to a preferred network which is associated with the Weighting factor SP2.

The optimization function F may be implemented as a parameterized function for instance a multi-layers artificial neural network that can be of the form:

Optimization function F defined as:

$$F(\text{Target\_Q}) = A_n(M_n(X_{n-1}) + B_n) \text{ with}$$
$$X_{n-1} = A_{n-1}(M_{n-1}(X_{n-2}) + B_{n-1})$$
$$\ldots$$
$$X_0 = \text{Target\_Q (the input of the function } F)$$

Where $A_i$ is an activation function (e.g. sigmoid, rectified linear unit, Soft-max), $M_i$ is a matrix of dimension N of real numbers, and $B_i$ is the bias vector.

The output data of the optimization function F is the set of SPi values.

The checking and adjustment to the internal parameters of the optimization function F, may be performed by an adjustment function. In particular, using the stochastic gradient descent algorithm (well known in machine learning domain), the Adjustment function back propagates the error to the internal parameters of the optimization function F in order to minimize the error during the training phase of the optimization function F.

The Weighting factor manager 14 may be configured to update the internal parameters used by the optimization function F via the Adjustment function.

In one embodiment, the Weighting factor manager 14 may be configured to update the internal parameters of the optimization function F as a result of an Adjustment function which aims at checking that the difference between a forecast SPi generated by the optimization function (F) applied to the actual roaming quota usage (Hist_Q) and the actual usage of SP_i (i.e. historical data Hist_SP_i) is lower than a predefined threshold. This phase is called the training phase of the optimization function F.

For instance, the Adjustment function may select new values for the internal parameters so that a Loss function defined as Loss(F(Hist_Q), Hist_SP_i)=$\|F(\text{Hist\_Q})-\text{Hist\_SP\_i}\|$, where $\|X\|$ is a defined norm of X (e.g. Loss function may be the cross entropy function, or mean squared error function):

$$\text{Loss } (F(\text{Hist\_Q}), \text{Hisit\_SP\_i}) < 10^{-6}$$

The predefined threshold is set to 0,000001 in this example.

Preferably, the Adjustment function performed small changes to the internal parameters of the optimization function F during training phase, by back-propagating the calculated loss to the successive upper neural network layers. Each time modifying the internal parameters of the neural network layer in order to decrease the loss. This process is also known as stochastic gradient descent.

In one embodiment, the Adjustment function may use machine learning based on historical data provided by both the Analyzer unit 16 and the Monitoring unit 18.

In one embodiment, the Weighting factor manager 14 may be configured to update the content of the set of the lists of preferred networks. For instance, a new list may be added to the previous set of lists. By reference to the set described at FIG. 1, the set may be updated with a third list comprising the following preferred networks: PLMN5, PLMN2, PLMN6 and attached to the weighting factor SP3.

In another example, the content or order of an existing list of preferred networks may be updated by the Weighting factor manager 14.

Each time the Weighting factor manager 14 has updated either the Weighting factors or the lists of the set, it sent the updated data (set of list+group of Weighting factors)—also named pack—to the OTA server 20.

Figure 3:
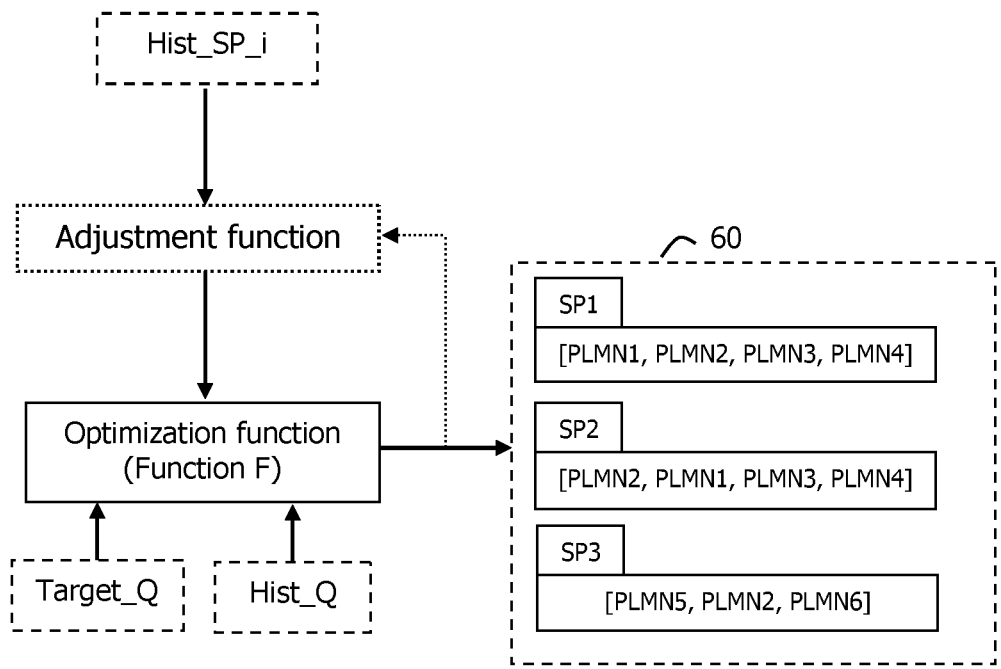
FIG. 3 shows a flowchart showing an example of the updating phase of a pack comprising the lists of preferred networks and the attached weighting factors according to the invention.

FIG. 3 illustrates a flowchart showing an example of the updating phase of a pack comprising the lists of preferred networks and their attached weighting factors according to the invention.

During the training phase of the optimization function F, the function F may get as input parameter an actual roaming quota usage (Hist_Q) for each possible preferred networks. The actual roaming quota usage reflects the roaming usage of a preferred network for a given period. Typically, such an actual roaming quota usage is measured by tracking roaming communications for each geographic area of interest (e.g. by country or state).

During the training phase of the optimization function F, the Adjustment function may get as input parameter historical data (Hist_SP_i) of the selected weighting factors by tracking weighting factors attached to the lists that have been selected by the selection function. In other words, the historical data of a weighting factor can be the number of times the list associated to the weighting factor has been sent to a user equipment.

During the operational phase, the optimization function F may get as input parameter a target roaming quota usage (Target_Q) for each of the possible preferred networks. The target roaming quota usage reflects the roaming usage desired for a preferred network for a given duration or period. Such a target roaming quota usage is generally defined by a partnership agreement between two MNOs.

The optimization function F may get as input parameter all the available preferred networks and the previous generated pack.

The optimization function F uses the input parameters for generating a new pack 60 including several lists of preferred networks and their allocated weighting factors.

In one embodiment, the optimization function F can generate a new group of weighting factors which are allocated to existing lists of preferred networks.

In one embodiment, the optimization function F can generate both a new set of lists of preferred networks and a new group of associated weighting factors.

In one embodiment, the optimization function F can generate a pack for each location to be covered. For instance, a pack may be dedicated to one country. For instance, all the lists of the pack may be attached to roaming in Germany.

In one embodiment, the optimization function F can generate a pack including several lists of preferred networks, each of said list being allocated to one country. For instance, the pack may include a list attached to roaming in Spain and a list attached to roaming in Italy.

Figure 4:
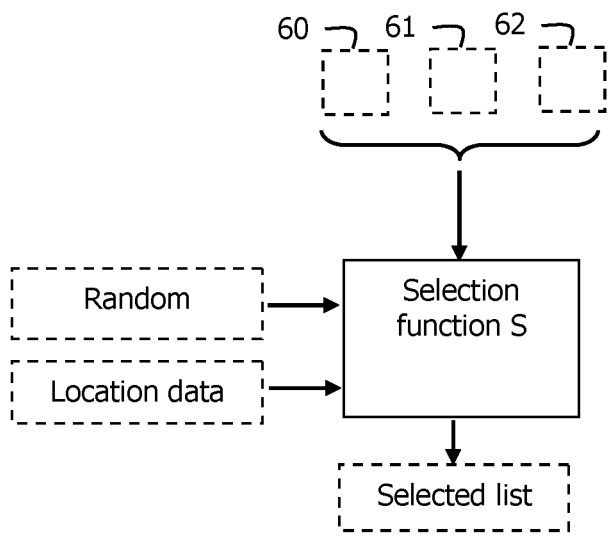
FIG. 4 shows a flowchart showing an example of the selection phase of one list of preferred networks intended to be sent to a terminal according to the invention.

FIG. 4 illustrates a flowchart showing an example of the selection phase of one list of preferred networks intended to be sent to a terminal according to the invention.

The selection function S may get as input parameters a plurality of packs generated by the optimization function F. For instance, three packs 60, 61 and 62 may be considered by the selection function S. These three packs are assume to have been provided to the OTA platform 20 which stores them.

The selection function S may get as input parameter the location data received by the OTA platform 20.

The selection function S may get as input parameter one or several random values provided by a random generator.

The selection function may use the input parameters for selecting one list among the packs. For instance, the selection function may discard all the packs which are not relevant for the geographic area corresponding to the location data and then apply as many random values to each weighting factor.

Assuming that only the pack 60 is compliant with the location data received by the OTA server 20, a range of values may be assigned to each pre-selected PLMN list in the pack 60, each range amplitude being proportional to the associated selection probability of the PLMN List (SPi). For instance the first list is assigned to range starting from 1 to 40 if its associated SP1 is equal to 40%, the second list is assigned contiguous range 41 to 70 if its associated SP2 is equal to 30% and so on. The total range of values is made equal to 100 so that the amplitude assigned to each list is proportional to the probability SPi associated to the list of PLMNs. The selection function may then get a random number between 1 and 100. The random value is assumed to have a discrete uniform probability distribution between 1 and 100. Depending on the drawn number the selected list is the one, which the drawn random number belongs to the assigned range of values. In the example, if the random number is 67, it is the second list of PLMNs that is selected with the assigned range 41 to 70.

Thanks to the invention, the list of preferred networks which can be sent to terminals is not frozen during a long period. In other words, if several terminals—assumed to be in the same area—request the downloading of a list of preferred networks, they may receive a list which is different from the other lists sent to the other terminals. Since the terminals will then use the differentiated lists, the invention works to optimize the consumption of each network according to the target roaming quota usage of each preferred network.

It must be understood, within the scope of the invention that the above-described embodiments are provided as non-limitative examples. For example, the number of packs provided to the OTA server may be huge, and a pack may comprise any number of preferred networks. Features of the described examples may be partly and fully combined.

The invention claimed is:

1. A computer-implemented method for updating a terminal comprising a secure element, wherein a OTA (Over-the-Air) platform receives at least a location data reflecting a location of the terminal and a request for downloading a list of preferred networks in the terminal, wherein the method comprises:
i) the OTA platform receives both a set of lists of preferred networks and a group of weighting factors (SP1, SP2, SP3), each list of the set having one weighting factor of said group attached to said each list,
ii) the OTA platform selects the list of preferred networks from the set by using a selection function (S) taking into account at least the location data, a random value, and the weighting factors attached to the set of lists, and
iii) by enciphering the selected list, the OTA platform generates an enciphered list of preferred networks and sends over the air the enciphered list to the terminal;

wherein each of said preferred networks is associated with its own target roaming quota usage, and wherein at least one weighting factor associated to a given list of the set is updated as a result of an optimization function (F) which aims at generating one weighting factor based on a target roaming quota usage associated to each preferred network of the given list.

2. The computer-implemented method according to claim 1, wherein a monitoring unit generates an actual roaming quota usage (Hist_Q) by tracking roaming communication used by a fleet of terminals that may comprise the terminal,
wherein an analyzer unit records an historical data of the weighting factors (Hist_SP_i) by tracking the weighting factors attached to the set of lists selected by said selection function (S),
wherein the optimization function (F) uses internal parameters when running, and
wherein said internal parameters are updated as a result of an Adjustment function which aims at checking that a difference between a forecast SPi (selection probability of a PLMN List) generated by said optimization function (F) applied to said actual roaming quota usage (Hist_Q) and the historical data (Hist_SP_i) is lower than a predefined threshold.

3. The computer-implemented method according to claim 1, wherein the Adjustment function uses machine learning on an optimization function F based on historical data provided by both said Analyzer unit and said Monitoring unit, wherein said optimization function F computes a new value for a Weighting factor based on a target roaming quota value Target_Q allocated to one of said preferred networks that is associated with said Weighting factor.

4. An OTA (Over-the-Air) platform able to receive a location data reflecting a location of a terminal comprising a secure element and a request for downloading a list of preferred networks in the terminal,
wherein the OTA platform is configured to:
i) receive both a set of lists of preferred networks and a group of weighting factors (SP1, SP2, SP3), each list of the set having one weighting factor of said group attached to said each list,
ii) select the list of preferred networks from the set by using a selection function (S) taking into account at least the location data, a random value, and the weighting factors attached to the set of lists, and
iii) generate an enciphered list of preferred networks by enciphering the selected list and to send over the air the enciphered list to the terminal;
wherein the OTA platform further comprises:
a monitoring unit configured to generate an actual historical communication quota usage (Hist_Q) by tracking roaming communication used by a fleet of terminals comprising the terminal; and
an analyzer unit configured to record an historical data (hist_SP_i) of weighting factors attached to lists selected by said selection function (S), said analyzer unit being configured to provide the Weighting factor manager said historical data (hist_SP_i) of weighting factors for said Weighting factor manager to adjust via an Adjustment function the internal parameters of said optimization function (F) based on actual communication quota usage and historical actual weighting factors selected by said OTA platform.

5. A system for updating a terminal comprising
a secure element;
an OTA (Over-the-Air) platform able to receive a location data reflecting a location of a terminal comprising said secure element and a request for downloading a list of preferred networks in the terminal,
wherein the OTA platform is configured to:
i) receive both a set of lists of preferred networks and a group of weighting factors (SP1, SP2, SP3), each list of the set having one weighting factor of said group attached to it said each list,
ii) select the list of preferred networks from the set by using a selection function (S) taking into account at least the location data, a random value, and the weighting factors attached to the set of lists,
iii) generate an enciphered list of preferred networks by enciphering the selected list and to send over the air the enciphered list to the terminal;
and,
a Steering of Roaming device which is configured to provide the OTA platform with both the set of lists of preferred networks and said group of weighting factors; and
wherein each of said preferred networks is associated with its own target roaming quota usage, and wherein the Steering of Roaming device is configured to update at least one weighting factor associated to a given list of the set as a result of an optimization function which aims at generating one weighting factor based the Target roaming quota usage associated to at least one preferred network belonging to the given list.

6. The system according to claim 5, wherein the system comprises a monitoring unit configured to generate an actual historical communication quota usage (Hist_Q) by tracking roaming communication used by a fleet of terminals comprising the terminal and wherein the system comprises an analyzer unit configured to record an historical data (hist_SP_i) of weighting factors attached to lists selected by said selection function (S), said analyzer unit being configured to provide the Weighting factor manager said historical data (hist_SP_i) of weighting factors for said Weighting factor manager to adjust via an Adjustment function the internal parameters of said optimization function (F) based on actual communication quota usage and historical actual weighting factors selected by said OTA platform.

7. The system of claim 6, wherein the optimization function F computes a new value for a Weighting factor based on a target roaming quota value Target_Q allocated to one of said preferred networks which is associated with said Weighting factor.

8. The system of claim 7, wherein the optimization function F is implemented as a parameterized function in a multi-layer artificial neural network incorporating a stochastic gradient descent algorithm.

9. The system of claim 7, where the adjustment function checks that a difference between a forecast SPi generated by the optimization function (F) applied to an actual roaming quota usage and said historical communication quota usage is lower than a predefined threshold, and if so, said Weighting factor manager updates said internal parameters used by the optimization function F via the adjustment function.

10. The OTA platform of claim 4, wherein the optimization function F computes a new value for a Weighting factor based on a target roaming quota value Target_Q allocated to one of said preferred networks which is associated with said Weighting factor.

11. The OTA platform of claim 10, wherein the optimization function F is implemented as a parameterized function in a multi-layer artificial neural network incorporating a stochastic gradient descent algorithm.

12. The OTA platform of claim 11, where the adjustment function checks that a difference between a forecast SPi generated by the optimization function (F) applied to an actual roaming quota usage and said historical communication quota usage is lower than a predefined threshold, and if so, said Weighting factor manager updates said internal parameters used by the optimization function F via the adjustment function.

\* \* \* \* \*